Patented May 13, 1941

2,242,062

UNITED STATES PATENT OFFICE 2,242,062

THERAPEUTIC AGENT AND FOOD FROM WATERMELONS

Matthew Evertz, Chicago, Ill.

No Drawing. Application January 2, 1940, Serial No. 312,097

8 Claims. (Cl. 260—236.5)

This invention relates to the extraction of the therapeutic principle from all parts of the watermelon. The material has been found to be efficacious for the reduction of high blood pressure and of value in the treatment of bladder disturbances.

This application is a continuation in part of my application Serial No. 169,646, filed October 18, 1937, entitled Therapeutic agent and food.

One of the objects of the invention is to provide a method for securing the therapeutic principle in condensed form.

Another object of the invention is to provide an improved method of recovering the purified therapeutic principle.

Other objects of the invention will be apparent from the description and claims which follow.

The presence in watermelon seeds of a therapeutic principle of value in the reduction of high blood pressure in man has been investigated by a number of workers. One process for producing such a substance is described in United States Patent No. 1,626,321 to Barksdale. The drug produced by the Barksdale method is termed in that patent "cucurbocitrin."

I have found that the water soluble therapeutic principle may be extracted from watermelon seeds, watermelon rind, watermelon pulp, watermelon vine, or watermelon roots. I have also discovered that the therapeutic principle is present in both the kernal and the hull in watermelon seeds, being associated with the cellulose of the plant.

According to the treatment process of the present invention, the watermelon part to be employed is dried in any suitable manner and is comminuted to approximately twenty mesh.

In practicing the method of the present invention, 1000 grams of the powdered product is soaked for a period, about twenty-four hours, in a suitable hydrocarbon fat solvent, for example, benzene, carbon tetrachloride, petroleum ether, or acetone, or mixtures of these have been found most satisfactory. Following soaking, the solvent together with the removed fats is decanted from the mixture and thereafter the watermelon residue is evaporated to dryness.

The dried powder of this residue is now mixed with 5000 cc. of distilled water, in which it is permitted to stand for another period, about twenty-four hours, at about 10° C. to prevent bacterial decomposition. However, should it be desired to practice this treatment step at room temperature, 100 cc. of toluene may be added to the mixture. Following this soaking, the supernatant toluene is removed, should this treatment be employed, and the remaining mixture then is filtered and evaporated to dryness. This residue is resuspended in distilled water and is heated to boiling to coagulate colloidal protein matter, following which the mixture is filtered and again is evaporated to dryness. This latter treatment is continued until the filtrate shows a decidedly clear dark brown color.

This residue now is suspended in a 70% alcohol solution, filtered and evaporated to dryness. In this treatment step, most of the active therapeutic principle is extracted.

Further purification, however, is preferably carried out by continuous Soxhlet extraction in which the dried residue of the last treatment step is first treated with a solvent of the class consisting of ethyl ether, ethyl acetate and chloroform, or mixtures of these, to remove inert materials. The residue of this treatment is a dried bitter tasting substance, from which the principle is further extracted with a suitable aliphatic alcohol, for example, absolute methyl alcohol in a continuous Soxhlet extraction apparatus until the solvent can no longer extract any of the active principle, which has been found to be about four hours. The alcoholic extract of this treatment is clear orange brown gold in color, and is evaporated to dryness.

The product of this treatment is sufficiently pure for medicinal use and has been employed with great success in the reduction of hypertension, urinary urgency, urinary frequency and other distressing symptoms. It may be given in milk or other liquids, such as carbonated water. It may be mixed in syrups from its own fruit juice, or used with other sugars for serving, preserving and to increase palatability. It may also be mixed and served in foods and cereals.

If desired, the principle of the previous treatment steps may be carried to pure crystalline form by subsequent reextraction with an aliphatic alcohol, for example, absolute methyl alcohol, and precipitation carried out with any suitable aliphatic or aromatic ester, ether or ketone, for example, ethyl acetate, ethyl ether, petroleum ether or phenyl acetate.

More specifically, the dried residue of the previous treatment is reextracted with warm absolute methyl alcohol and is precipitated with ethyl acetate, and this treatment repeated until on drying there is formed a crystalline product with glistening needles. Recrystallization from hot or cold alcohols gives a different arrangement formation, but noticeably characteristic crystals.

I claim:

1. The method of extracting the therapeutic principle from parts of watermelon, which comprises reducing the dried watermelon part to a powder, soaking the powdered watermelon part in a fat solvent, removing the solvent and removed fats and drying the residue, soaking the dried residue in water for a period approximately twenty-four hours, filtering and drying the filtrate, suspending the dried filtrate in water at a temperature approximately 100° C., filtering and drying the filtrate, suspending the last mentioned dried filtrate in a water alcohol solution, filtering and drying the filtrate, subjecting the last mentioned dried filtrate to extraction treatment with a solvent of the class consisting of ethyl ether, ethyl acetate and chloroform and mixtures thereof, subjecting the residue of this extract to further extraction treatment with methyl alcohol and drying the alcohol extract.

2. The method of extracting the therapeutic principle from parts of watermelon, which comprises reducing the dried watermelon part to a powder, soaking the powdered watermelon part in a fat solvent, removing the solvent and removed fats and drying the residue, soaking the dried residue in water for a period approximately twenty-four hours, filtering and drying the filtrate, suspending the dried filtrate in water approximately 100° C., filtering and drying the filtrate, suspending the last mentioned dried filtrate in a water alcohol solution, filtering and drying the filtrate, subjecting the last mentioned dried filtrate to Soxhlet extraction with a solvent of the class consisting of ethyl ether, ethyl acetate and chloroform and mixtures thereof, subjecting the residue of this extraction to Soxhlet extraction with methyl alcohol and drying the alcohol extract.

3. The method of extracting the therapeutic principle from parts of watermelon, which comprises reducing the dried watermelon part to a powder, soaking the powdered watermelon part in a fat solvent, removing the solvent and removed fats and drying the residue, soaking the dried residue in water for a period approximately twenty-four hours and at a temperature approximately 10° C., filtering and drying the filtrate, suspending the dried filtrate in water approximately 100° C., filtering and drying the filtrate, suspending the last mentioned dried filtrate in a water alcohol solution, filtering and drying the filtrate, subjecting the last mentioned dried filtrate to Soxhlet extraction with a solvent of the class consisting of ethyl ether, ethyl acetate and chloroform and mixtures thereof, subjecting the residue of this extraction to Soxhlet extraction with methyl alcohol and drying the alcohol extract.

4. The method of extracting the therapeutic principle from the parts of watermelon, which comprises reducing the dried watermelon part to a powder, soaking the powdered watermelon part in a fat solvent, removing the solvent and removed fats and drying the residue, soaking the dried residue in water for a period approximately twenty-four hours and at a temperature approximately 10° C., filtering and drying the filtrate, successively suspending the dried filtrate in water at approximately 100° C., and filtering and evaporating the filtrate to dryness until the dried filtrate shows a clear dark brown in color, soaking the dried filtrate of the last mentioned treatment step in a water alcohol solution, filtering and drying the filtrate, subjecting the last mentioned dried filtrate to Soxhlet extraction with a solvent of the class consisting of ethyl ether, ethyl acetate, and chloroform and mixtures thereof, subjecting the residue of this extraction to Soxhlet extraction with methyl alcohol, and drying the alcohol extract.

5. The method of extracting the therapeutic principle from the parts of watermelon, which comprises reducing the dried watermelon part to a powder, soaking the powdered watermelon part in a fat solvent, removing the solvent and removed fats and drying the residue, soaking the dried residue in water for a period approximately twenty-four hours and at a temperature approximately 10° C., filtering and drying the filtrate, successively suspending the dried filtrate in water at approximately 100° C., and filtering and evaporating the filtrate to dryness until the dried filtrate shows a clear dark brown in color, soaking the dried filtrate of the last treatment step in a water alcohol solution, filtering and drying the filtrate, subjecting the last mentioned dried filtrate to Soxhlet extraction with a solvent of the class consisting of ethyl ether, ethyl acetate, and chloroform and mixtures thereof, subjecting the residue of this extraction to Soxhlet extraction with methyl alcohol, and successively reextracting the dried alcohol extract with methyl alcohol and precipitating the principle with a substance of the class consisting of aliphatic and aromatic esters, ethers and ketones and mixtures thereof, and drying the precipitate to a clear, crystalline product.

6. In the method of extracting the therapeutic principle of a watermelon part to form a clear crystalline product, the steps which comprise successively extracting the recovered principle with absolute methyl alcohol, precipitating the principle with a substance of the class consisting of aliphatic and aromatic esters, ethers, and ketones and mixtures thereof, recovering the precipitate, and thereafter drying the precipitate.

7. The method of extracting the therapeutic principle from parts of watermelon, which comprises reducing the dried watermelon part to a powder, soaking the powdered watermelon part in a fat solvent, removing the solvent and removed fats and drying the residue, soaking the dried residue in water for a period approximately twenty-four hours and at a temperature between 10° C. and 24° C., filtering and drying the filtrate, suspending the dried filtrate in water approximately 100° C., filtering and drying the filtrate, suspending the last mentioned dried filtrate in a water alcohol solution, filtering and drying the filtrate, subjecting the last mentioned dried filtrate to Soxhlet extraction with a solvent of the class consisting of ethyl ether, ethyl acetate and chloroform and mixtures thereof, subjecting the residue of this extraction to Soxhlet extraction with methyl alcohol and drying the alcohol extract.

8. The method of extracting the therapeutic principle from parts of watermelon, which comprises reducing the dried watermelon part to a powder, soaking the powdered watermelon part in a fat solvent, removing the solvent and removed fats and drying the residue, soaking the dried residue in water and toluene for a period approximately twenty-four hours and at a temperature approximately 24° C., removing the toluene and water and drying the residue, suspending the dried residue in water approximately 100° C., filtering and drying the filtrate, suspending the last mentioned dried filtrate in a water alcohol solution, filtering and drying the filtrate, subjecting the last mentioned dried filtrate to Soxhlet extraction with a solvent of the class consisting of ethyl ether, ethyl acetate and chloroform and mixtures thereof, subjecting the residue of this extraction to Soxhlet extraction with methyl alcohol and drying the alcohol extract.

MATTHEW EVERTZ.